United States Patent [19]
Casey

[11] 3,896,884
[45] July 29, 1975

[54] ANTI-BACKLASH ATTACHMENT MOUNTING

[75] Inventor: Thomas P. Casey, Burlington, Iowa

[73] Assignee: J. I. Case Company, Racine, Wis.

[22] Filed: May 10, 1974

[21] Appl. No.: 468,820

[52] U.S. Cl............... 172/776; 214/138 R; 85/50 R
[51] Int. Cl.............................................. A01b 15/14
[58] Field of Search ........... 172/439, 677, 248, 272, 172/681, 776; 280/461, 479, 150 F; 214/138; 85/50

[56] References Cited
UNITED STATES PATENTS

| | | | |
|---|---|---|---|
| 2,822,739 | 2/1958 | Altgelt........................ | 280/461 A X |
| 3,172,686 | 3/1965 | Beard............................. | 280/461 A |
| 3,178,984 | 4/1965 | Barothy............................. | 85/50 R |
| 3,220,579 | 11/1965 | Pilch............................. | 214/138 R |
| 3,220,751 | 11/1965 | Iweedale........................ | 280/461 A |
| 3,398,983 | 8/1968 | Olsson ........................... | 172/272 X |

*Primary Examiner*—Stephen C. Pellegrino
*Attorney, Agent, or Firm*—Arthur J. Hansmann

[57] ABSTRACT

An anti-backlash attachment mounting for an implement on a tractor or the like and with the tractor having a mounting arm and the implement having an attachment or mounting frame or piece, and with a link extending between the attachment piece and the tractor arm and with the implement and tractor having two attachment points which have conical bushings to make them snug. A link extends from the implement, and a pin is disposed between the tractor arm and the link, and a clamp secures the tractor arm and implement link together by a clamping force applied through the pin. The implement is therefore supported on the tractor in a snug manner and without any play or looseness and thus there is an anti-backlash attachment.

7 Claims, 4 Drawing Figures

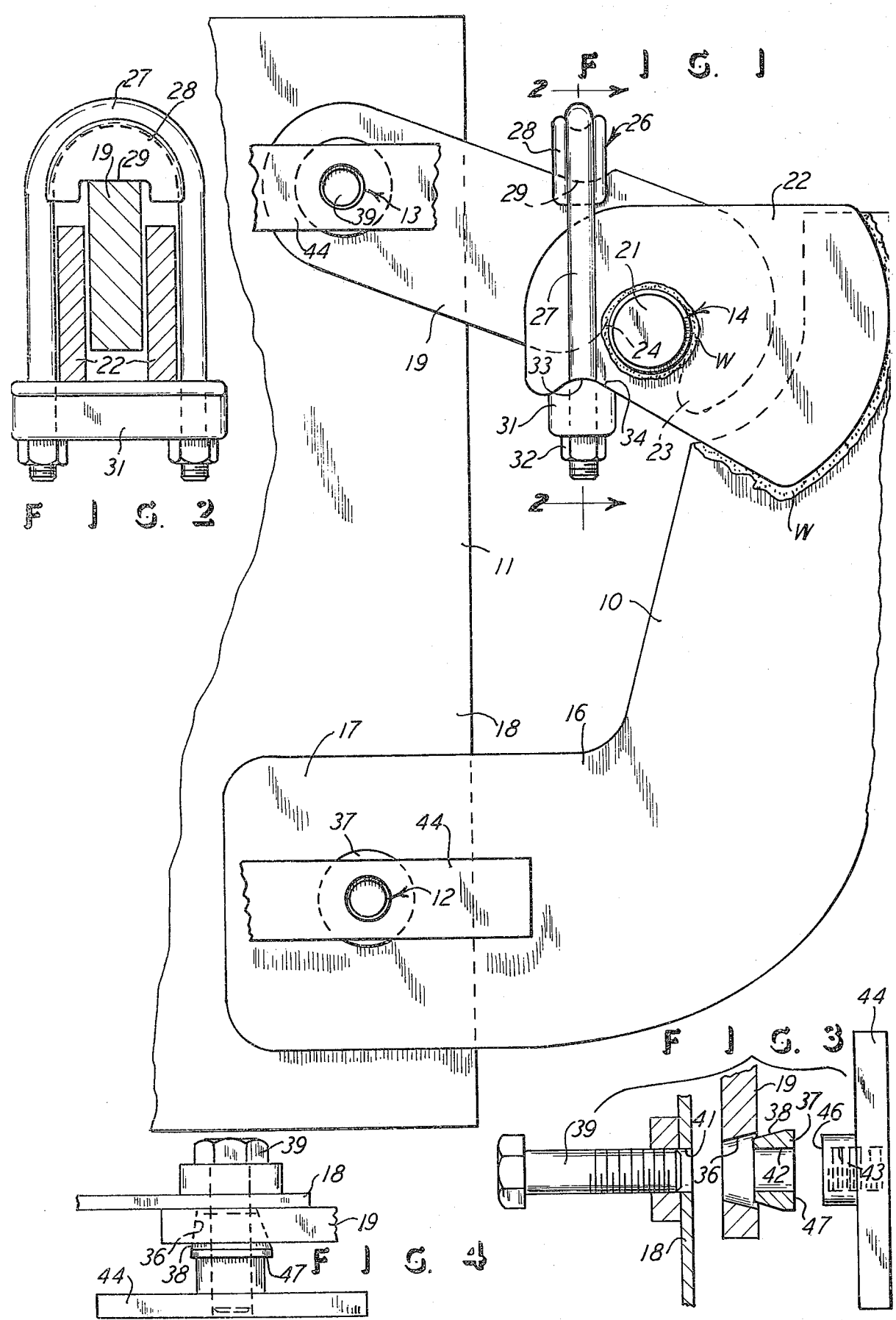

ANTI-BACKLASH ATTACHMENT MOUNTING

This invention relates to an anti-backlash attachment mounting for an implement on a tractor or the like, and, more particularly, it relates to an attachment mounting wherein an implement can be mounted onto a tractor without any play or movement between the points of the attachment, and thus the implement is stable relative to the tractor and there is no movement of the attaching pieces between the tractor and the implement.

Many different arrangements for the purpose of attaching an implement to a tractor or the like are already known. Many of these prior art attachments have arrangements for making them a quick and easily accomplished type of attachment, both for assembly and disassembly between the tractor and the implement. Also, the prior art is already aware of arrangements where the stability of the implement is a factor in the construction or arrangement of the attaching pieces between the tractor and the implement. Examples of these prior art arrangements are found in U.S. Pat. Nos. 3,220,579 and 3,220,751 and 3,528,685.

Even though some inventing has already been accomplished with regard to attaching an implement to a tractor, the present invention improves upon the prior art arrangements and it generally provides for an attachment wherein there is a minimum or even no movement or backlash between the tractor and the implement attached thereto, and that is the general object of this invention.

Additionally, it is an object of this invention to provide an attachment mounting for use between a tractor and an implement and with the mounting being arranged so that the implement can be readily and easily attached and detached relative to the tractor, and no special tools, skills, maneuvering, or the like are required in making the attachment and in doing the detaching.

A further object of this invention is to provide an attachment mounting for an implement relative to a tractor and to have the mounting arranged with a minimum of complexity, weight, and expense in the mounting parts themselves, but yet have maximum strength in the assembly, along with the anti-backlash feature mentioned above. In accomplishing this objective, the mounting parts are therefore simplified but are of the required strength to support a relatively heavy implement on a tractor, such as a backhoe implement as shown in the cited prior art patents.

Another object of this invention is to provide an anti-backlash attachment mounting for an implement on a tractor, and to have the mounting of the three-point type for maximum stability, and to have at least two of the three mounting points arranged with a conically shaped bushing or connecting member which removes any play or movement between the parts at that connection and thereby renders the connection of optimum rigidity, and also the mounting is arranged with a clamp member which can be tightened to take up any play or movement at a third mounting point, and the clamp is also used to reinforce the link or arm which extends to make the connection at the third mounting point.

Other objects and advantages have become apparent upon reading the following description in light of the accompanying drawings.

BRIEF DESCRIPTION OF THE DRAWINGS

FIG. 1 is a side elevational view of a preferred embodiment of this invention and showing a fragment of a tractor and a fragment of an implement.

FIG. 2 is a sectional view taken along the line 2—2 of FIG. 1.

FIG. 3 is an exploded view of a portion of the embodiment shown in FIG. 1, and being shown partly in section.

FIG. 4 is a view similar to FIG. 3, but with the pieces in their assembled, rather than exploded, position.

DETAILED DESCRIPTION OF THE PREFERRED EMBODIMENT

The drawings show a portion of a tractor 10 and a portion of an implement 11, and these two machines are connected together by a three-point hitch, with each point being respectively designated 12, 13, and 14. The tractor has a frame piece in the form of an arm 16 extending in an end portion 17 and carrying the hitch point 12 which connects to the implement frame piece which is in the form of an upright plate 18. The implement may of course be a backhoe of a well-known construction, and the idea of attaching the implement to the tractor is also well known in the art, such as shown in U.S. Pat. No. 3,220,579. Therefore, the implement portion 11 is rigid with the tractor portion 10 (similar to elements 18 and 16, respectively, of U.S. Pat. No. 3,220,579) and the conventional articularly mounted backhoe members are pivoted on the implement portion 18 but are unshown although similar to those in said patent. Likewise, there are two hitch points 12 and 13, one on each side of implement portion 18, as is conventional and as in U.S. Pat. No. 3,220,579, in accord with the understanding of those skilled in this art.

The hitch point 13 is located spaced above the hitch point 12, and it makes the connection with the upper portion of the implement frame piece 18, as shown. An arm or link 19 is also connected with the hitch point 13 and extends to the hitch point 14 to connect with a pin 21 which is shown welded to two spaced-apart extension pieces 22 forming a portion of the tractor arm or frame portion 16, and the pin 21 is shown welded to the extension plates 22, and the plates 22 are also shown welded to the tractor portion 16, and the weldments are indicated at W. Thus, the arm or link 19 has a hook end 23 which has a curved surface 24 which extends over the top of the pin 21, and the link 19 thus extends between the two spaced-apart tractor frame portions 22, as seen in FIG. 2. The tractor frame portions 22 therefore extend underneath the pin 21, that is they extend to provide upward support for the pin 21, and the link 19 extends downwardly on the pin 21 and can pivot about the hitch point 13 for the connection at the hitch point 14, as being described.

To snugly secure the connection between the arms 16 and 19 relative to the pin 21, a clamp, generally designated 26, extends between the plates 22 and the link 19, as shown. The clamp 26 is shown to be a U-bolt 27 which extends on opposite sides of the two tractor plates 22, and a mounting saddle 28 extends between the upper portion of the bolt 27 and the upwardly curved portion 29 of the link 19. Thus the saddle 28 is snugly received in the link concave portion 29, and is secure therewith, and another saddle piece 31 is disposed on the lower end of the U-bolt and is retained thereon by nuts 32. The tractor plates 22 have upwardly curved surfaces 33, and the saddle 31 has matching curved surfaces 34 which snugly nest with the surfaces 33 and thereby mate with each other to be snug abutting surfaces. With this arrangement, the clamp 26 is secured by the curved surfaces 29 and 33 of the implement arm 19 and the tractor arm 16 respectively, so that the clamp 26 is tight with the two arms, as shown. Also, the clamp 26 is shown disposed intermediate the hitch points 13 and 14, that is, it is disposed along the intermediate length of the link 19, and it thereby structurally reinforces the link 19 in its function of holding the weight and forces on the attachment 11. Accordingly, the structural arrangement with the link 19 can be as described, by virtue of the reinforcing clamp 26, and of course the clamp 26 is snug with the two arms and draws the arms together relative to the pin 21 and thereby secures the hitch point 14. Of course the pin 21 need not be welded to either arm, but it could be simply a free or loose pin having the clamp 26 force the respective arms against the pin from opposite sides, to thereby provide the clamping arrangement being described.

To complete the snug connection between the two machines and to effect the anti-backlash attachment mounting, the hitch points 12 and 13 are constructed so that they are self-tightening and preclude any movement at the hitch points. Therefore, the points 12 and 13 are shown in detail in FIGS. 3 and 4, and it will be understood that either arm 16 or 19 is included in the point, and, for purposes of consistency, the arm 19 is identified, and it is shown to have a tapered or conical opening 36 which snugly receives a bushing 37 which has a conical exterior surface 38 which mates with the surface defining the conical opening 36, as seen in FIG. 4. A bolt 39 extends through a circular opening 41 in the attachment piece 11, and the bolt 39 also extends through a circular opening 42 in the bushing 37, and it further extends into a threaded opening 43 in a Tee-nut 44 which provides for easy tightening and loosening of the nut relative to the bolt 39. Therefore, tightening the bolt 39 and nut 44 will cause the nut surface 46 to bear against the bushing surface 47 and thereby wedge the bushing surface 38 against the conical surface defining the opening 36, and therefore the hitch points 12 and 13 are snug and without any backlash and they adjust for any manufacturing tolerances in making the parts shown in FIG. 3 and FIG. 4. Of course the bolt 39 is snug within the holes 41 and 42, as well as in the threaded hole 43, so there also there is no play or backlash movement.

With this arrangement, a three-point hitch connection is provided, and the anti-backlash connecting points 12 and 13 are selfaligning to eliminate any backlash at those points, and the clamp 26 can be tightened to secure the hitch point 14 through pivotal action of the link 19 somewhat prior to final tightening of the nut 44 at the hitch point 13, and thereby leave the link 19 slightly pivotal about the hitch point 13 until the hitch point 14 is secured. Also, it will be seen and understood that the described mounting arms 16 and 19 overlap each other at the location of the hitch point 14 so that they mutually contact the pin 21 which spans the opposite sides of the two tractor arm plates 22, and the pin 21 thereby presents its central portion for contact by the curved portion 24 of the link 19, as shown.

What is claimed is:

1. An anti-backlash attachment mounting for an implement on a tractor or the like, comprising an attachment mounting piece having two bolt holes spaced apart therein, two arms with one thereof being affixed to a tractor and with each of said arms having a conically-shaped opening in one end of each of said arms, a bushing disposed in each of said conically shaped openings and having a conically shaped exterior for respective snug axial positioning of said bushings in said conically shaped openings and with said bushings having axially disposed openings of the diametrical size of said bolt holes, said arms being respectively aligned on said mounting piece with said bushing axially disposed openings respectively axially aligned with said bolt holes, a bolt snugly disposed in each of the aligned pairs of said bolt holes and said bushing axially disposed openings, a nut tightened on each of said bolts for securing said arms to said mounting piece through the conical shape of said bushings, said arms extending from their respective locations of securement by said bolts on said mounting piece and extending to a location overlapping each other in their extending portions, a horizontally disposed pin extending into respective upper and lower contact with respective ones of the overlapping portions of said arms for joining said arms together, and a clamp connected between said arms overlapping portions for forcing the latter against said pin in their respective upper and lower contact with said pin, and thereby attach said implement to said tractor.

2. The anti-backlash attachment mounting as claimed in claim 1, wherein said two bolts and said pin are on three separate axes relative to each other and thereby present a three-point hitch, and said nuts are tee-nuts for ready tightening and loosening on said bolts.

3. The anti-backlash attachment mounting as claimed in claim 1, wherein said clamp is a U-bolt and extends around said extending portions for securing the latter together through said pin.

4. The anti-backlash attachment mounting as claimed in claim 3, wherein said U-bolt is spaced away from the axis of said pin and extends over one of said arms at a location intermediate said pin and the respective one of said bolts on said one arm, for structurally reinforcing said one arm.

5. The anti-backlash attachment mounting as claimed in claim 1, wherein one of said arms is pivotal about its said bolt and on said mounting piece, for pivoting into tight contact with said pin in response to the force applied by said clamp.

6. An anti-backlash attachment mounting for an implement on a tractor, comprising a tractor-supported implement mounting arm, a horizontally disposed pin supported by said arm, an implement frame piece, a link, said arm and said link being attached to said implement frame piece at spaced-apart locations thereon and through means of conically shaped bushings and bolts and nuts for snug and clearance-free attachment, said link pivotally extending from said implement frame piece and in overlying contact with said pin, and a clamp extending between said link and said arm for securing the latter two together through said pin.

7. The anti-backlash attachment mounting for an implement on a tractor, as claimed in claim 6, wherein said clamp is a U-bolt and extends around said link and said arm and is at an intermediate portion on said link relative to said pin and said bolt which attaches said link to said implement frame piece, for structurally reinforcing said link.

* * * * *